Patented May 31, 1938

2,119,458

UNITED STATES PATENT OFFICE 2,119,458

PROCESS FOR PROTECTING MATERIAL EMPLOYING PESTPROOFING MEDIA AND MATERIAL SO PROTECTED

Dalton B. Faloon, Beacon, and Roland M. Whittaker, New York, N. Y., assignors to Hammond Paint & Chemical Co., Inc., Beacon, N. Y., a corporation of New York No Drawing. Application December 16, 1935, Serial No. 54,786

5 Claims. (Cl. 21—4)

This invention relates to poison for the destruction of insect life in various phases. Although particularly applicable to the destruction of moths and their larvae, the novel poison is not confined to this use, for it may be employed in the destruction of carpet beetles, silver fish, bookworms and the like. The invention also relates to a process for protecting various animal and vegetable material against destruction by such insect life, and also relates to the material when so protected.

The important objects of the invention are to provide an effective poison, as set out above, which has no detrimental effects upon the material protected, a novel poison which may be permanently fixed to, or become a part of the material to be protected, a poison which has no unpleasant odor and which may be employed without danger to persons practicing the process or coming into contact with the material when protected.

Other important objects are to provide a process as set out above, which process is especially efficient and which will provide for a lasting protection of the material to be protected.

Still other important objects are to provide a material which is well protected against the attack of insects and allied life, the material retaining the protection substantially during the entire life of the material.

Other objects and advantages of the invention will be apparent during the course of the following detailed description.

We have discovered that calcium selenate and antimony trifluoride are particularly effective moth-proofing agents when used in water solutions as sprays or baths for material liable to the attack by moths and their larvae, and the solutions allowed to dry upon the material. Their only drawback is that, being soluble in water, the compounds mentioned will be gradually washed away when the protected materials are washed. However, they have been found superior to other water soluble selenates and soluble antimony compounds respectively.

In the use of the above mentioned antimony compounds and the selenate, the material, woolen, for instance, is preferably immersed in a one per cent solution of any of these and after a thorough soaking at a temperature which may be, for example, between 15° and 30° C., the material is centrifuged and dried. While the strength of the solution may vary, within reasonable limits, a one per cent solution has been found the most satisfactory, and while centrifuging is recommended, any approved method of getting rid of the excess solution may be employed.

An added step in the protection of furs, woolen goods, carpets, rugs, books, paper and the like has been discovered by us in the provision of an insecticide which may be incorporated with these materials to provide a poison which will remain incorporated with the materials substantially during their whole life. Such insecticides are: The water-insoluble selenates such as the antimony and alkaline-earth salts of selenic acid, and the water-insoluble fluorides, such as those of cerium and the alkaline-earth salts of hydrofluoric acid. These have been found to be particularly effective insecticides.

However, since these insecticides are water-insoluble and since the employment of organic solvents frequently result in destruction of the material to be impregnated, we have discovered a process whereby these insoluble insecticides may be incorporated with, fixed or deposited upon or in the material to be protected. Examples of the process are as follows:—

Example 1

Woolen material, such as cloth, is thoroughly soaked in a one per cent solution of calcium selenate and centrifuged. The material is then soaked in a one per cent solution of antimony trifluoride, centrifuged and dried. As as result, the water-insoluble calcium fluoride and antimony selenate are deposited within the cloth.

Example 2

Woolen material, such as woolen cloth, is thoroughly soaked in a one per cent solution of calcium selenate and centrifuged. The material is then soaked in a saturated solution of barium fluoride, centrifuged and dried. As a result, calcium fluoride and barium selenate, both insoluble, are incorporated with the cloth.

Example 3

In place of the barium fluoride of Example 2, strontium fluoride, in a saturated solution, may be employed and the result is that calcium fluoride and strontium selenate are incorporated with the material.

Example 4

Material, such as woolen cloth, is thoroughly soaked in a one per cent solution of antimony trifluoride and centrifuged. The material is then soaked in a one per cent solution of cerium sulphate. The material is then centrifuged and dried. The resulting chemical reaction precipitates cerium fluoride and antimony sulphate so that they will be retained by the material, the cerium fluoride remaining with the material substantially during its entire life.

Example 5

Furs, at the time of or immediately following bleaching or dyeing, are dipped in a one per cent solution of calcium selenate, the excess solution removed and the material then dipped in a one per cent solution of antimony trifluoride, and dried. The resulting chemical action is similar to that in Example 1.

Example 6

Carpets are scrubbed with a one per cent solution of calcium selenate and excess solution removed if necessary. The carpets are then scrubbed with a one per cent solution of antimony trifluoride, and dried. The resulting chemical action is similar to that set out in Example 1.

These processes are given by way of example, since it is now apparent that the process is not confined to woolen material such as woolen cloth. While it is preferred, a one per cent solution be employed, this is given by way of example for the strength of the solution may be increased or decreased as desired. Bath temperatures preferably should range from 15° C. to 30° C. although there is no exact temperature at which the bath must be maintained. Centrifuging is preferred for most material, the material being centrifuged between the two baths until it will not give off drops of the solution. It is not necessary to have the material dry to the touch, but for the purpose of economy it is best not to have a surplus of one solution carried over into the other.

A further example of the process is that where the same is employed in the impregnation of book paper with the insoluble insecticides. During the course of the manufacture of the paper from pulp, the soluble selenates and fluorides mentioned may be added to the pulp, in suitable solutions, and as a result the paper will be impregnated with the insoluble insecticides.

Preferably, the aim sought is to incorporate with the material not one, but two, insecticides, these insecticides being preferably water-insoluble. As a result not only is the poison so fixed upon and/or in the material so that it will remain there substantially during the entire life of the material, but there is the double protection afforded by the two insecticides rather than one.

Aqueous solutions are preferred for it has been discovered that organic solvents for certain of the fluorides and selenates mentioned sometimes have detrimental effects upon the material, such as robbing the material of its gloss, etc.

The term "fixed" in the claims is employed to distinguish from depositing upon the material the dry, powdered, water-insoluble insecticide.

Various changes may be made to the form of the invention herein shown and described, as well as to the process steps without departing from the spirit of the invention or the scope of the claims.

What is claimed is:

1. The steps in the process of protecting material such as wool, furs and floor coverings, against attack by insects and their larvae which comprise treating said material with an aqueous solution of calcium selenate, and treating said material with an aqueous solution of an alkaline-earth fluoride.

2. The steps in the process for protecting material such as wool, furs, floor coverings and paper, against attack by insects and their larvae which comprise impregnating said material with an aqueous solution of calcium selenate, removing excess solution from said material, and impregnating said material with an aqueous solution of an alkaline-earth fluoride.

3. The steps in the process of protecting material, such as wool, furs, floor coverings and paper, against attacks by insects and their larvae, which consist in contacting said material with a water-soluble selenate in an aqueous solution and contacting said material with an alkali earth fluoride, which will react with the water-soluble selenate and incorporate with the material a water-insoluble alkali-earth selenate and a water-insoluble fluoride.

4. In a process for rendering material mothproof, the steps which include treating the material with each of two separate aqueous solutions, one being of a fluoride selected from the group of fluorides which consists of antimony fluoride, barium fluoride and strontium fluoride and the other being of calcium selenate, which will react with the selected fluoride to fix with the material calcium fluoride and a water-insoluble selenate of the group which consists of antimony selenate, barium selenate and strontium selenate.

5. Material liable to attack by insects, such as moths and their larvae, having incorporated therein the water-insoluble insecticidal reaction products of a fluoride selected from the group of fluorides which consists of antimony fluoride, barium fluoride and strontium fluoride, and calcium selenate which will react with the selected fluoride to yield calcium fluoride and a water-insoluble selenate of the group which consists of antimony selenate, barium selenate and strontium selenate.

DALTON B. FALOON.
ROLAND M. WHITTAKER.